United States Patent
Yang

(10) Patent No.: US 12,511,229 B2
(45) Date of Patent: Dec. 30, 2025

(54) METHOD FOR ACCESSING FLASH MEMORY MODULE AND ASSOCIATED FLASH MEMORY CONTROLLER AND MEMORY DEVICE

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 25 days.

(21) Appl. No.: 18/420,803

(22) Filed: Jan. 24, 2024

(65) Prior Publication Data
US 2024/0403207 A1 Dec. 5, 2024

(30) Foreign Application Priority Data
May 31, 2023 (TW) .................................. 112120346

(51) Int. Cl.
*G06F 12/02* (2006.01)

(52) U.S. Cl.
CPC .. *G06F 12/0246* (2013.01); *G06F 2212/7203* (2013.01)

(58) Field of Classification Search
CPC ................ G06F 12/0246; G06F 2212/7203
See application file for complete search history.

(56) References Cited

U.S. PATENT DOCUMENTS

| | | | |
|---|---|---|---|
| 2014/0013033 A1* | 1/2014 | Sharon | G11C 11/5628 711/103 |
| 2014/0281145 A1* | 9/2014 | Tomlin | G06F 12/1081 711/103 |
| 2017/0315868 A1 | 11/2017 | Yang | |
| 2019/0065389 A1* | 2/2019 | Choi | G06F 3/065 |
| 2022/0066876 A1* | 3/2022 | Yeung | G06F 11/1048 |
| 2023/0376212 A1* | 11/2023 | Chae | G06F 12/0246 |

FOREIGN PATENT DOCUMENTS

| | | |
|---|---|---|
| CN | 113035262 A | 6/2021 |
| TW | 201738900 A | 11/2017 |
| TW | 201935486 A | 9/2019 |
| TW | 202249018 A | 12/2022 |

* cited by examiner

Primary Examiner — Masud K Khan
(74) Attorney, Agent, or Firm — Winston Hsu

(57) ABSTRACT

The present invention provides a method for accessing a flash memory module, wherein the method includes the steps of: configuring the flash memory module to have a super block, wherein the super block comprises a plurality of blocks respectively located in a plurality of dies; encoding M data respectively to sequentially generate M temporary parities, wherein M is a positive integer greater than two; storing the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities; and generating M parities according to the M temporary parities, respectively, and writing the M parities into the super block.

15 Claims, 7 Drawing Sheets

$(D1 \oplus D2 \oplus D3 \oplus D4) \oplus (D33 \oplus D34 \oplus D35 \oplus D36) \oplus \cdots (D1761 \oplus D1762 \oplus D1763) = PAR1$ $(D5 \oplus D6 \oplus D7 \oplus D8) \oplus (D37 \oplus D38 \oplus D39 \oplus D40) \oplus \cdots (D1764 \oplus D1765 \oplus D1766) = PAR2$

........

$(D29 \oplus D30 \oplus D31 \oplus D32) \oplus (D61 \oplus D62 \oplus D63 \oplus D64) \oplus \cdots (D1782 \oplus D1783 \oplus D1784) = PAR8$

FIG. 3

METHOD FOR ACCESSING FLASH MEMORY MODULE AND ASSOCIATED FLASH MEMORY CONTROLLER AND MEMORY DEVICE

BACKGROUND OF THE INVENTION

1. Field of the Invention

The present invention relates to a flash memory controller.

2. Description of the Prior Art

In order to protect data in the flash memory module better, the encoder in the flash memory controller will use a redundant array of independent disks (RAID) encoding method to encode the data to be written into the flash memory module to generate multiple parities. However, due to the limited space of a RAID buffer in the encoder, during the RAID encoding process, it is necessary to move the parities that do not need to be encoded at the moment to a dynamic random access memory (DRAM) first to release the RAID buffer for other parities for encoding. Therefore, since the parity needs to be repeatedly exchanged/moved between the RAID buffer and the DRAM during the RAID encoding process, the efficiency of the encoder will be affected.

SUMMARY OF THE INVENTION

It is therefore an objective of the present invention to provide a flash memory controller, which can reduce the number of parity exchange/movement between the RAID buffer and the DRAM, to solve the problem described in the prior art.

According to one embodiment of the present invention, a method for accessing a flash memory module is disclosed, wherein the flash memory module comprises a plurality of dies, each die comprises a plurality of blocks, each block comprises a plurality of pages. The method comprises the steps of: configuring the flash memory module to have a super block, wherein the super block comprises a plurality of blocks respectively located in the plurality of dies; encoding M data respectively to sequentially generate M temporary parities, wherein M is a positive integer greater than two, and each of the M data is used to be written into a page of each of the plurality of blocks; storing the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, but other temporary parities of the M temporary parities or their subsequent updated temporary parities are not stored in the first part of the N areas; and generating M parities according to the M temporary parities, respectively, and writing the M parities into the super block.

According to one embodiment of the present invention, a flash memory controller is disclosed, wherein the flash memory controller is used to access a flash memory module, the flash memory module comprises a plurality of dies, each die comprises a plurality of blocks, each block comprises a plurality of pages. The flash memory controller comprises a read-only memory configured to store a program code, a microprocessor configured to execute the program code to control access of the flash memory module, an encoder and a buffer. The microprocessor configures the flash memory module to have a super block, wherein the super block comprises a plurality of blocks respectively located in the plurality of dies; the encoder encodes M data respectively to sequentially generate M temporary parities, wherein M is a positive integer greater than two, and each of the M data is used to be written into a page of each of the plurality of blocks; the encoder stores the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, but other temporary parities of the M temporary parities or their subsequent updated temporary parities are not stored in the first part of the N areas; and the encoder generates M parities according to the M temporary parities, respectively, and writing the M parities into the super block.

According to one embodiment of the present invention, a memory device comprising a flash memory module and a flash memory controller is disclosed The flash memory module comprises a plurality of dies, wherein each die comprises a plurality of blocks, and each block comprises a plurality of pages. The flash memory controller is configured to access the flash memory module, and the flash memory controller is configured to perform the steps of: configuring the flash memory module to have a super block, wherein the super block comprises a plurality of blocks respectively located in the plurality of dies; encoding M data respectively to sequentially generate M temporary parities, wherein M is a positive integer greater than two, and each of the M data is used to be written into a page of each of the plurality of blocks; storing the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, but other temporary parities of the M temporary parities or their subsequent updated temporary parities are not stored in the first part of the N areas; and generating M parities according to the M temporary parities, respectively, and writing the M parities into the super block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of generating parities according to one embodiment of the present invention.

DETAILED DESCRIPTION

Figure 1:
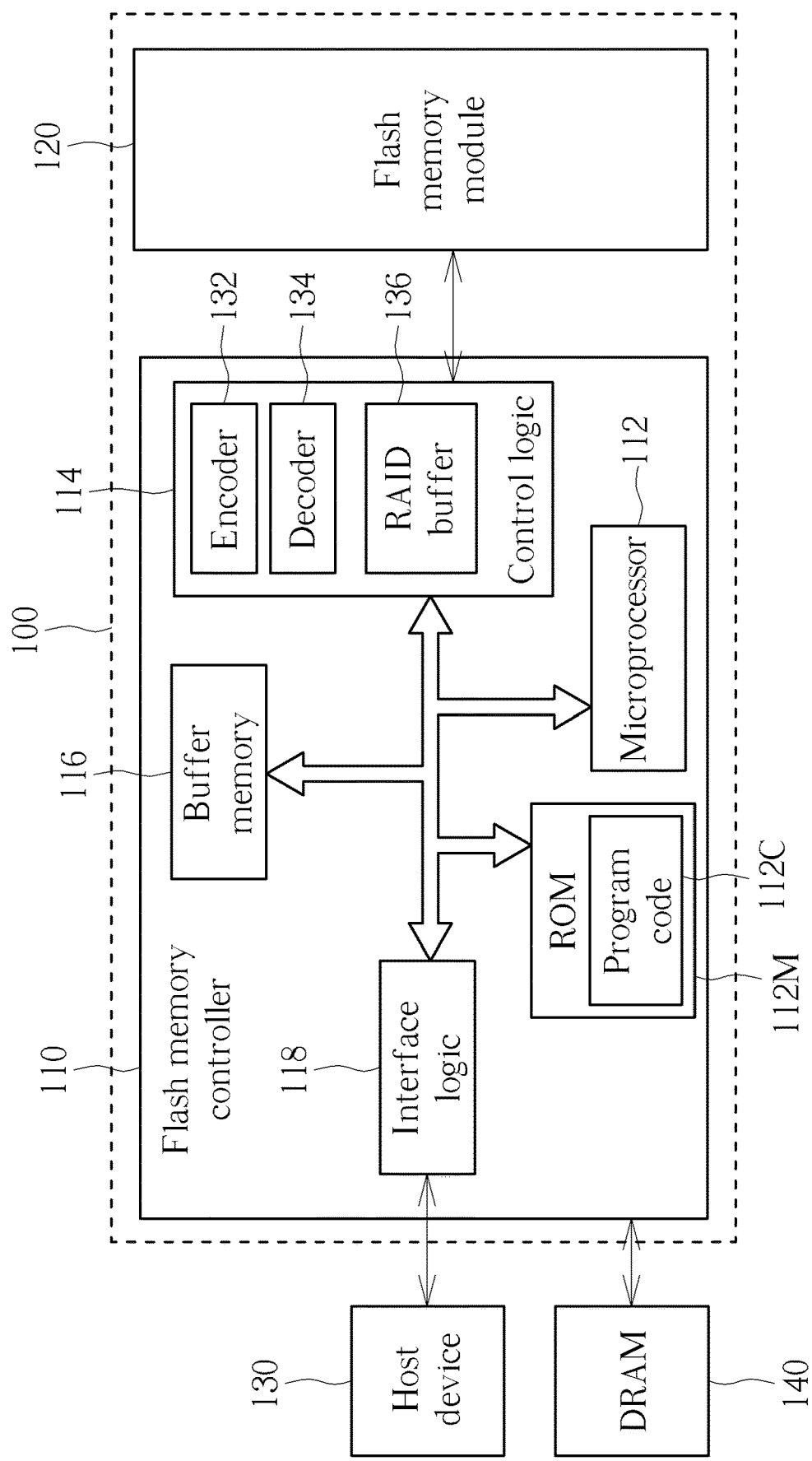
FIG. 1 is diagram illustrating a memory device according to one embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116 and an interface logic 118. The ROM 112M is arranged to store a program code 112C, and the microprocessor 112 is arranged to execute the program code 112C to control access of the flash memory module 120. The control logic 114 includes an encoder 132, a decoder 134 and a RAID buffer 136, wherein the encoder 132 is arranged to encode data that is written into the flash memory module 120 to generate a corresponding parity (also known as an error correction code (ECC)), the decoder 134 is arranged to decode data that is read from the flash memory module 120, and the RAID buffer 136 is arranged to temporarily store the parities additionally generated by the encoder 132 when encoding the data.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 and/or a DRAM 140 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

Figure 2:
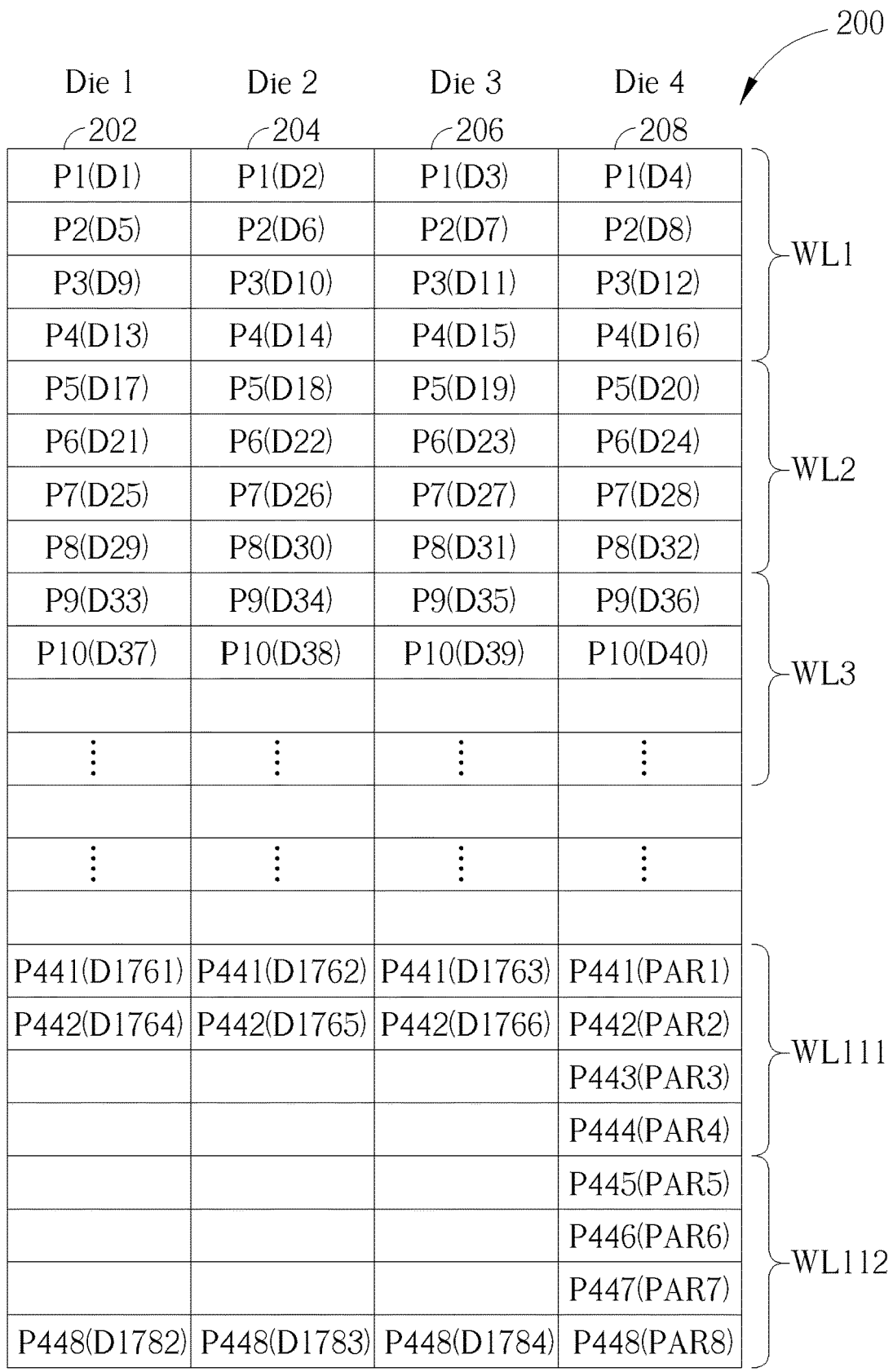
FIG. 2 is a diagram of writing data into a super block according to one embodiment of the present invention.

FIG. 2 is a diagram of writing data into a super block according to one embodiment of the present invention. As shown in FIG. 2, assume that the flash memory module 120 includes four dies (e.g., die 1 to die 4), and each die includes a plurality of blocks, and at this time, the microprocessor 112 can configure the blocks belonging to different planes or different dies within the flash memory module 120 as a super block to facilitate the management of data access. In this embodiment, it is illustrated that there is only one plane in one die, but the present invention is not limited thereto. As shown in FIG. 2, the die 1 to die 4 respectively include blocks (physical blocks) 202, 204, 206 and 208, and the microprocessor 112 can configure the blocks 202, 204, 206 and 208 as a superblock 200, wherein the operation of the flash memory controller 110 when accessing the superblock 200 is similar to accessing a normal block. For example, the super block 200 itself is an erase unit, that is, although the four blocks 202, 204, 206 and 208 of the super block 200 can be erased separately, however, the flash memory controller 110 must erase the four blocks 202, 204, 206 and 208 together. In addition, when the super block 200 performs data writing, the first page P1 of the block 202, the first page P1 of the block 204, the first page P1 of the block 206 and the first page P1 of the block 208 are sequentially written, and until the first page P1 of the block 208 completes the data writing, the data is written into the second page 2 of the block 202, the second page P2 of block 204 in sequence, . . . , and so on. In other words, the flash memory controller 110 will fill up the first page P1 of each of the blocks 202, 204, 206 and 208 in the super block 200 before continuing to write each of the second pages P2 of the blocks 202, 204, 206 and 208. The super block is a collection block logically set by the flash memory controller 110 for the convenience of managing the flash memory module 120, not a physical collection block. In addition, when performing garbage collection, calculating the effective pages of a block, and calculating the length of writing a block, calculations can also be performed in units of super blocks.

In this embodiment, the flash memory module 120 is implemented by a three-dimensional NAND-type flash memory (3D NAND-type flash) module, wherein each block is composed of a plurality of word lines, a plurality of bit lines and a plurality of memory cells. Since the architecture of the three-dimensional NAND flash memory is well known to those skilled in the art, it will not be described in the specification. In this embodiment, it is assumed that each block 202, 204, 206 and 208 is a single-level cell (SLC) block with 112 word lines, and one word line corresponds to four pages, for example, the word line WL1 corresponds to pages P1-P4, the word line WL2 corresponds to pages P5-P8, the word line WL3 corresponds to pages P9-P12, . . . , the word lines WL111 corresponds to pages P441-P444, and the word line WL112 corresponds to pages P445-P448.

In order to protect the data in the flash memory module 120 better, the encoder 132 will use a RAID encoding mechanism to encode the data written into the blocks 202, 204, 206 and 208 to generate multiple parities. In addition, because the data on adjacent word lines in the flash memory module 120 are likely to affect each other, that is, if data is written to the pages P5-P8 corresponding to the word line WL2 has writing error or an abnormal power failure, the data on the pages P1-P4 corresponding to the word line WL1 will also have errors. Therefore, the encoder 132 will interleave the word lines when performing RAID encoding, that is, the data of pages on adjacent word lines will not be encoded together. Specifically, referring to FIG. 2 and FIG. 3 at the same time, the encoder 132 will perform exclusive OR (XOR) operation on data D1 of the first page P1 of the block 202, data D2 of the first page P1 of the block 204, data D3 of the first page P1 of the block 206, data D4 of the first page P1 of block 208, data D33 of the ninth page P9 of block 202, data D34 of the ninth page P9 of block 204, data D35 of the ninth page P9 of the block 206, data D36 of the ninth page P9 of the block 208, . . . , data D1761 of the 441st page P441 of the block 202, data D1762 of the 441st page P441 of the block 204, and data of data D1763 of the 441st page P441 of the block 206, to generate a parity PAR1. Similarly, the encoder 132 will perform XOR operation on data D5 of the second page P2 of the block 202, data D6 of the second page P2 of the block 204, data D7 of the second page P2 of the block 206, data D8 of the second page P2 of the block 208, data D37 of the tenth page P10 of the block 202, data D38 of the tenth page P10 of the block 204, data D39 of the tenth page P10 of the block 206, data D40 of the tenth page P10 of the block 208, . . . , data D1764 of the 442nd page P442 of the block 202, data D1765 of the 442nd page P442 of the block 204, and data D1766 of the 442nd page P442 of the block 206, to generate a parity PAR2. Similar to the above operations, the encoder 132 generates parities PAR3-PAR8. In addition, the parities PAR1-PAR8 are respectively stored in pages P441-P448 of the block 208.

It is noted that each of D1-D1784 shown in FIG. 2 and FIG. 3 include original data from the host device 130 and the corresponding error correction code, that is, the encoder 132 encodes first data from the host device 130 to generate the data D1, encodes second data from the host device 130 to generate the data D2, . . . , and so on.

Because the data D1-D1784 shown in FIG. 2 and FIG. 3 are sequentially generated and written into the super block 200, the temporary parities PAR1'-PAR8' are generated and continuously updated during the process of generating the parities PAR1-PAR8, and are temporarily stored in the RAID buffer 136. However, since the RAID buffer 136 is usually implemented by using a relatively expensive static random access memory (SRAM), its capacity is limited and it cannot store all the temporary parities PAR1'-PAR8', and a size of each of the temporary parities PAR1'-PAR8' is equal to the size of a page. Therefore, under the situation that the RAID buffer 136 can only store part of the temporary parities PAR1'-PAR8', the temporary parities that do not need to be processed at present will be moved to the DRAM 140 first, and will be read from the DRAM 140 and loaded into the RAID buffer 136 when encoding is required. However, since the temporary parities PAR1'-PAR8' need to be frequently moved between the DRAM 140 and the RAID buffer 136, the performance of the flash memory controller 110 will be affected. Therefore, the present invention proposes a control method, which has a special parity swap mechanism, to reduce the number of movements of temporary parities between the DRAM 140 and the RAID buffer 136, to improve the performance of the flash memory controller 110.

Figure 4:
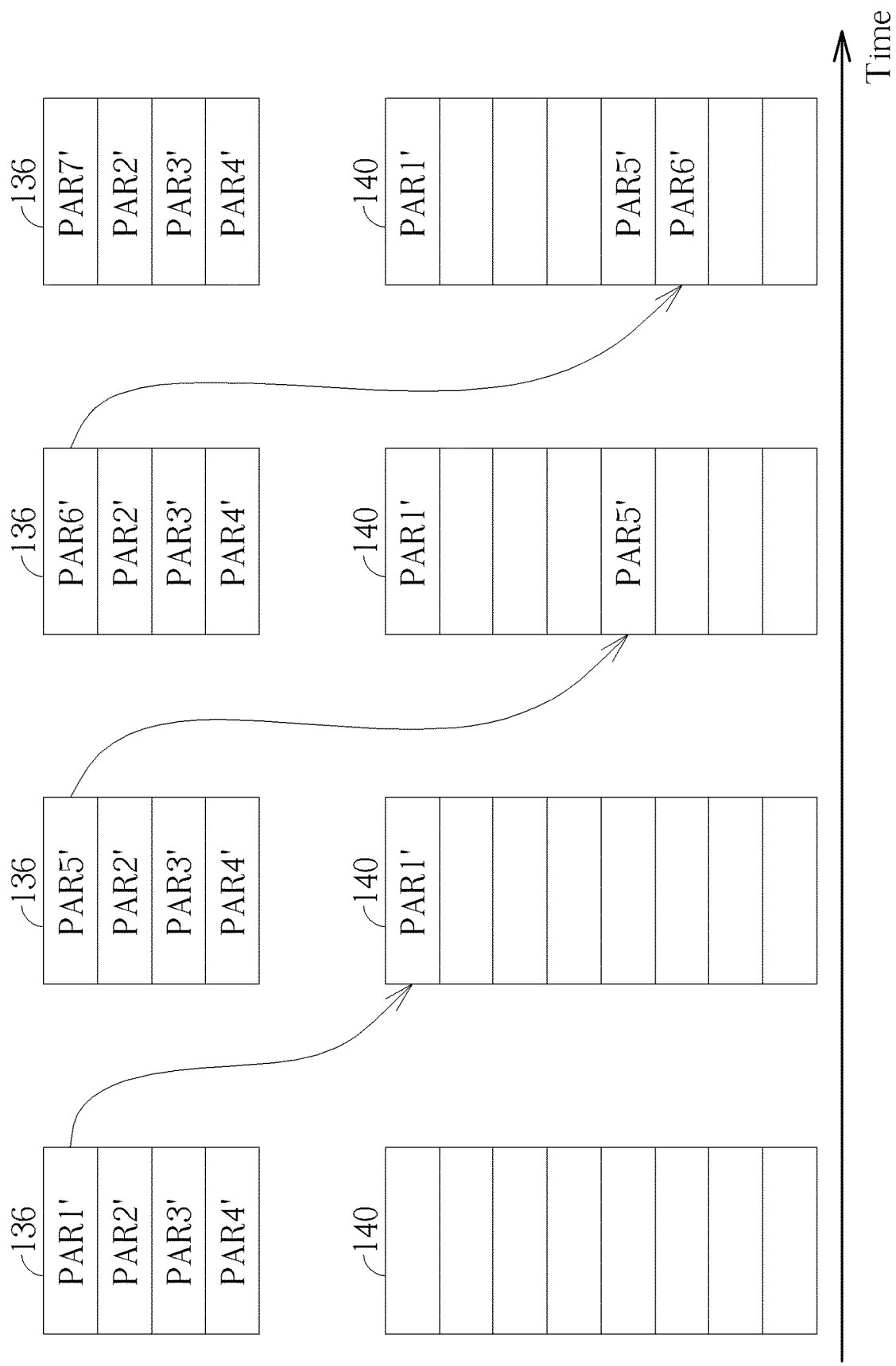
FIG. 4, FIG. 5 and FIG. 6 are diagrams of accessing a RAID buffer and a DRAM according to one embodiment of the present invention.
Figure 5:
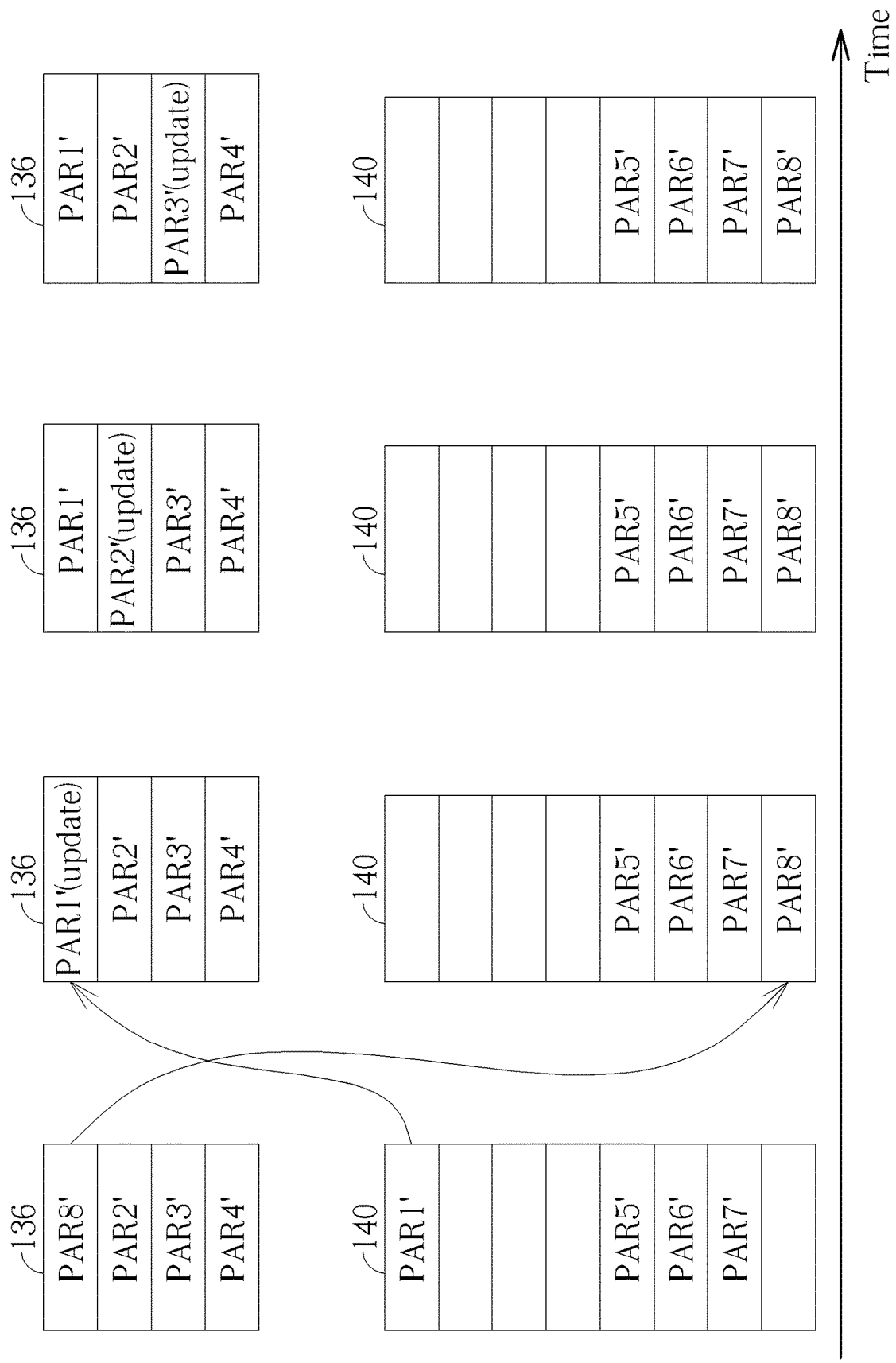
Figure 6:
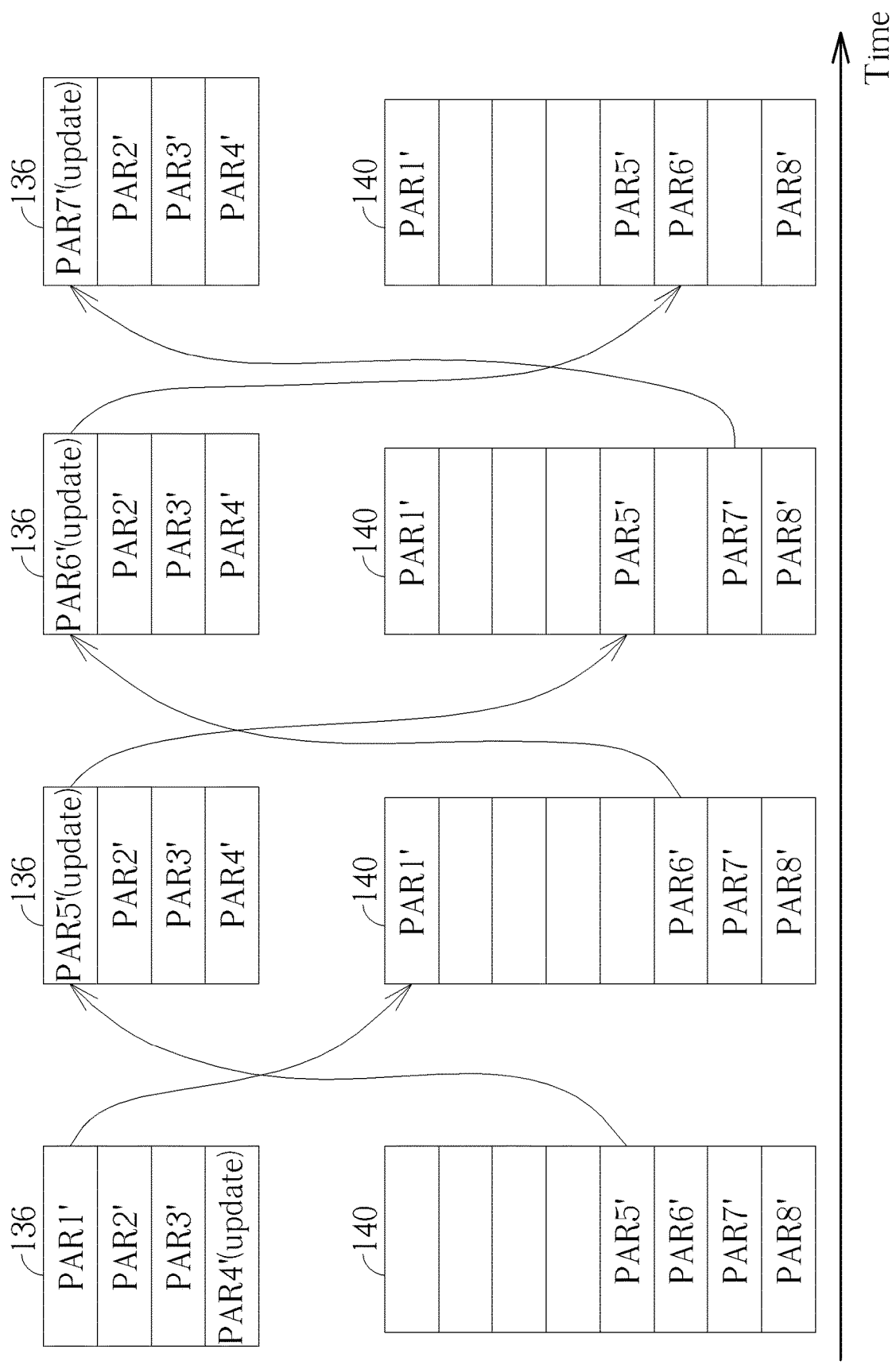

Specifically, referring to FIG. 4-FIG. 6, it is assumed that the size of the RAID buffer 136 is equal to four pages, that is, the RAID buffer 136 can only store four temporary parities. Firstly, the encoder 132 receives data from the host device 130 and encodes the data to generate data D1, D2, D3 and D4 in sequence, and the encoder 132 performs XOR operations on the data D1, D2, D3 and D4 to generate the temporary parity PAR1', and stores the temporary parity PAR1' in the first area of the RAID buffer 136. Next, the encoder 132 receives data from the host device 130 and encodes the data to generate data D5, D6, D7 and D8 in sequence, and the encoder 132 performs XOR operations on the data D5, D6, D7 and D8 in sequence to generate the temporary parity PAR2', and stores the temporary parity PAR2' in the second area of the RAID buffer 136. The encoder 132 receives data from the host device 130 and encodes the data to generate data D9, D10, D11 and D12 in sequence, and the encoder 132 performs XOR operations on the data D9, D10, D11 and D12 to generate the temporary parity PAR3', and stores the temporary parity PAR3' in the third area of the RAID buffer 136. The encoder 132 receives data from the host device 130 and encodes the data to generate data D13, D14, D15 and D16 in sequence, and the encoder 132 performs XOR operations on the data D13, D14, D15 and D16 to generate the temporary parity PAR4', and stores the temporary parity PAR4' in the fourth area of the RAID buffer 136.

Then, the encoder 132 receives the data from the host device 130 and performs encoding operation to start to generate the data D17, D18, D19 and D20 in sequence. At this time, since the RAID buffer 136 has no space to store the temporary parity PAR5', the microprocessor 112 moves the temporary parity PAR1' from the first area of the RAID buffer 136 to the DRAM 140, and then the encoder 132 sequentially performs XOR operations on the data D17, D18, D19 and D20 to generate the temporary parity PAR5', and the temporary parity PAR5' is stored in the first area of the RAID buffer 136.

Then, the encoder 132 receives the data from the host device 130 and performs encoding operation to start to generate the data D21, D22, D23 and D24 in sequence. At this time, since the RAID buffer 136 has no space to store the temporary parity PAR6', the microprocessor 112 moves the temporary parity PAR5' from the first area of the RAID buffer 136 to the DRAM 140, and then the encoder 132 sequentially performs XOR operations on the data D21, D22, D23 and D24 to generate the temporary parity PAR6', and the temporary parity PAR6' is stored in the first area of the RAID buffer 136.

Then, the encoder 132 receives the data from the host device 130 and performs encoding operation to start to generate the data D25, D26, D27 and D28 in sequence. At this time, since the RAID buffer 136 has no space to store the temporary parity PAR7', the microprocessor 112 moves the temporary parity PAR6' from the first area of the RAID buffer 136 to the DRAM 140, and then the encoder 132 sequentially performs XOR operations on the data D25, D26, D27 and D28 to generate the temporary parity PAR7', and the temporary parity PAR7' is stored in the first area of the RAID buffer 136.

Then, in FIG. 5, the encoder 132 receives the data from the host device 130 and performs encoding operation to start to generate the data D29, D30, D31 and D32 in sequence. At this time, since the RAID buffer 136 has no space to store the temporary parity PAR8', the microprocessor 112 moves the temporary parity PAR7' from the first area of the RAID buffer 136 to the DRAM 140, and then the encoder 132 sequentially performs XOR operations on the data D29, D30, D31 and D32 to generate the temporary parity PAR8', and the temporary parity PAR8' is stored in the first area of the RAID buffer 136.

Then, the encoder 132 receives the data from the host device 130 and performs encoding operation to start to generate the data D33, D34, D35 and D36 in sequence. At this time, since the RAID buffer 136 has no space to store the temporary parity PAR1', the microprocessor 112 moves the temporary parity PAR8' from the first area of the RAID buffer 136 to the DRAM 140, and moves the temporary parity PAR1' stored in the DRAM 140 to the first area of the RAID buffer 136. Afterwards, the encoder 132 sequentially performs XOR operations on the temporary parity PAR1' currently temporarily stored in the RAID buffer 136 and the data D33, D34 D35 and D36 to generate an updated temporary parity PAR1', and stores the updated temporary parity PAR1' stored in the first area of the RAID buffer 136. That is, the updated temporary parity PAR1' is the result of sequentially performing XOR operations on the data D1, D2, D3, D4, D33, D34, D35 and D36.

Then, the encoder 132 receives the data from the host device 130 and performs encoding operation to start to generate the data D37, D38, D39 and D40 in sequence. At this moment, because the RAID buffer 136 has stored temporary parity PAR2', the microprocessor 112 does not need to move data between the RAID buffer 136 and the DRAM 140, and the encoder 132 can directly sequentially perform XOR operations on the temporary parity PAR2' currently temporarily stored in the RAID buffer 136 and the data D37, D38, D39 and D40 to generate an updated temporary parity PAR2', and stores the updated temporary parity PAR2' in the second area of the RAID buffer 136.

Then, the encoder 132 receives the data from the host device 130 and performs encoding operation to start to generate the data D41, D42, D43 and D44 in sequence. At this moment, because the RAID buffer 136 has stored temporary parity PAR3', the microprocessor 112 does not need to move data between the RAID buffer 136 and the DRAM 140, and the encoder 132 can directly sequentially perform XOR operations on the temporary parity PAR3' currently temporarily stored in the RAID buffer 136 and the data D41, D42, D43 and D44 to generate an updated temporary parity PAR3', and stores the updated temporary parity PAR3' in the third area of the RAID buffer 136.

In FIG. 6, the encoder 132 receives the data from the host device 130 and performs encoding operation to start to generate the data D45, D46, D47 and D48 in sequence. At this moment, because the RAID buffer 136 has stored temporary parity PAR4', the microprocessor 112 does not need to move data between the RAID buffer 136 and the DRAM 140, and the encoder 132 can directly sequentially perform XOR operations on the temporary parity PAR4' currently temporarily stored in the RAID buffer 136 and the data D45, D46, D47 and D48 to generate an updated temporary parity PAR4', and stores the updated temporary parity PAR4' in the fourth area of the RAID buffer 136.

Then, the encoder 132 receives data from the host device 130 and performs encoding operation to start to generate the data D49, D50, D51 and D52 in sequence. At this time, since the RAID buffer 136 has no space to store the temporary parity PAR5', the microprocessor 112 moves the temporary parity PAR1' from the first area of the RAID buffer 136 to the DRAM 140, and moves the temporary parities PAR5' from the DRAM 140 to the first area of the RAID buffer 136. Afterwards, the encoder 132 sequentially performs XOR operations on the temporary parity PAR5' currently temporarily stored in the RAID buffer 136 and the data D49, D50, D51 and D52 to generate an updated temporary parity PAR5', and stores the updated temporary parity PAR5' in the first area of the RAID buffer 136.

Then, the encoder 132 receives data from the host device 130 and performs encoding operation to start to generate the data D53, D54, D55 and D56 in sequence. At this time, since the RAID buffer 136 has no space to store the temporary parity PAR6', the microprocessor 112 moves the temporary parity PAR5' from the first area of the RAID buffer 136 to the DRAM 140, and moves the temporary parities PAR6' from the DRAM 140 to the first area of the RAID buffer 136. Afterwards, the encoder 132 sequentially performs XOR operations on the temporary parity PAR6' currently temporarily stored in the RAID buffer 136 and the data D53, D54, D55 and D56 to generate an updated temporary parity PAR6', and stores the updated temporary parity PAR6' in the first area of the RAID buffer 136.

Then, the encoder 132 receives data from the host device 130 and performs encoding operation to start to generate the data D57, D58, D59 and D60 in sequence. At this time, since the RAID buffer 136 has no space to store the temporary parity PAR7', the microprocessor 112 moves the temporary parity PAR6' from the first area of the RAID buffer 136 to the DRAM 140, and moves the temporary parities PAR7' from the DRAM 140 to the first area of the RAID buffer 136. Afterwards, the encoder 132 sequentially performs XOR operations on the temporary parity PAR7' currently temporarily stored in the RAID buffer 136 and the data D57, D58, D59 and D60 to generate an updated temporary parity PAR7', and stores the updated temporary parity PAR7' in the first area of the RAID buffer 136.

Similar to the above operations, the encoder 132 continuously performs the encoding operation and XOR operation on the subsequent data to sequentially and cyclically generate temporary parities PAR1'-PAR8', until the final data is encoded to generate the parities PAR1-PAR8.

In the above embodiment, since the temporary parities PAR2'-PAR4' can be temporarily stored in the RAID buffer 136 without being moved to the DRAM 140, the speed at which the encoder 132 updates the temporary parities PAR2'-PAR4' can be increased to improve the efficiency of the flash memory controller 110.

In the embodiments of FIG. 4-FIG. 6, the second area, the third area and the fourth area of the RAID buffer 136 are always occupied by the temporary parities PAR2'-PAR4' respectively, and only the first area is used to sequentially store the temporary parities PAR1', PAR5', PAR6', PAR7' and PAR8', but the present invention is not limited thereto. For example, the RAID buffer 136 can assign any three of the four areas for three specific temporary parities (that is, any three of PAR1'-PAR8'), while the remaining one area is used to temporarily store the remaining five temporary parities in sequence. In another example, the RAID buffer 136 may assign some of the four areas (e.g., two areas) for a specific number of temporary parities (e.g., any two of PAR1'-PAR8'), while the remaining area(s) is/are used to temporarily store the remaining temporary parities in sequence. These alternative designs should belong to the scope of the present invention.

In the embodiments shown in FIG. 2 and FIG. 3, it is assumed that the super block 200 includes blocks 202, 204, 206 and 208 respectively located in four dies, the blocks 202, 204, 206 208 are all SLC blocks, one word line corresponds to four pages, and the encoder 132 encodes the data that is to be written into the super block 200 to generate eight parities PAR1-PAR8, but the present invention It is not limited to this. In other embodiments, the number of blocks included in the super block 200 can be changed according to the architecture of the flash memory module 120 and the designer's considerations. The blocks included in the super block 200 can be multi-level cell (MLC) blocks, triple-level cell (TLC) blocks, or quad-level cell (QLC) blocks. In addition, the number of multiple parities generated by the encoder 132 and the interval between multiple pages corresponding to the data used to generate each parity can also be determined according to the structure of the flash memory module 120, the type of the block, and the designer's considerations. In detail, assuming that the interval between multiple pages corresponding to the data used to generate each parity is 'M', the number of multiple parities generated by the encoder 132 is 'M', and the pages corresponding to the data used to generate the parity PAR1 are P1, P(1+M), P(1+2*M), P(1+3*M), . . . , the pages corresponding to the data used to generate the parity PAR2 are P2, P(2+M), P(2+2*M), P(2+3*M), . . . , and the pages corresponding to the data used to generate the Mth parity are P(M), P(M+M), P(M+2*M), P(M+3*M), . . . . In addition, the number of areas included in the RAID buffer 136 can be any positive integer 'N' less than 'M', that is the four areas described in the above-mentioned embodiment are not a limitation of the present invention, wherein each area of the RAID buffer 136 can only store the data of one page (that is, the data of each parity or temporary parity).

In the above embodiment, before generating any temporary parity, if the RAID buffer 136 does not have a previous temporary parity for encoding to generate the temporary parity, the microprocessor 112 can search from a first area of the RAID buffer 136 to determine one area whose data is not used for encoding at this moment as a specific area. Then, the temporary parity stored in the specific area of the RAID buffer 136 is moved to the DRAM 140, and the previous temporary parity is moved from the DRAM 140 to the specific area of the RAID buffer 136, for the encoding operation and generating the temporary parity.

Figure 7:
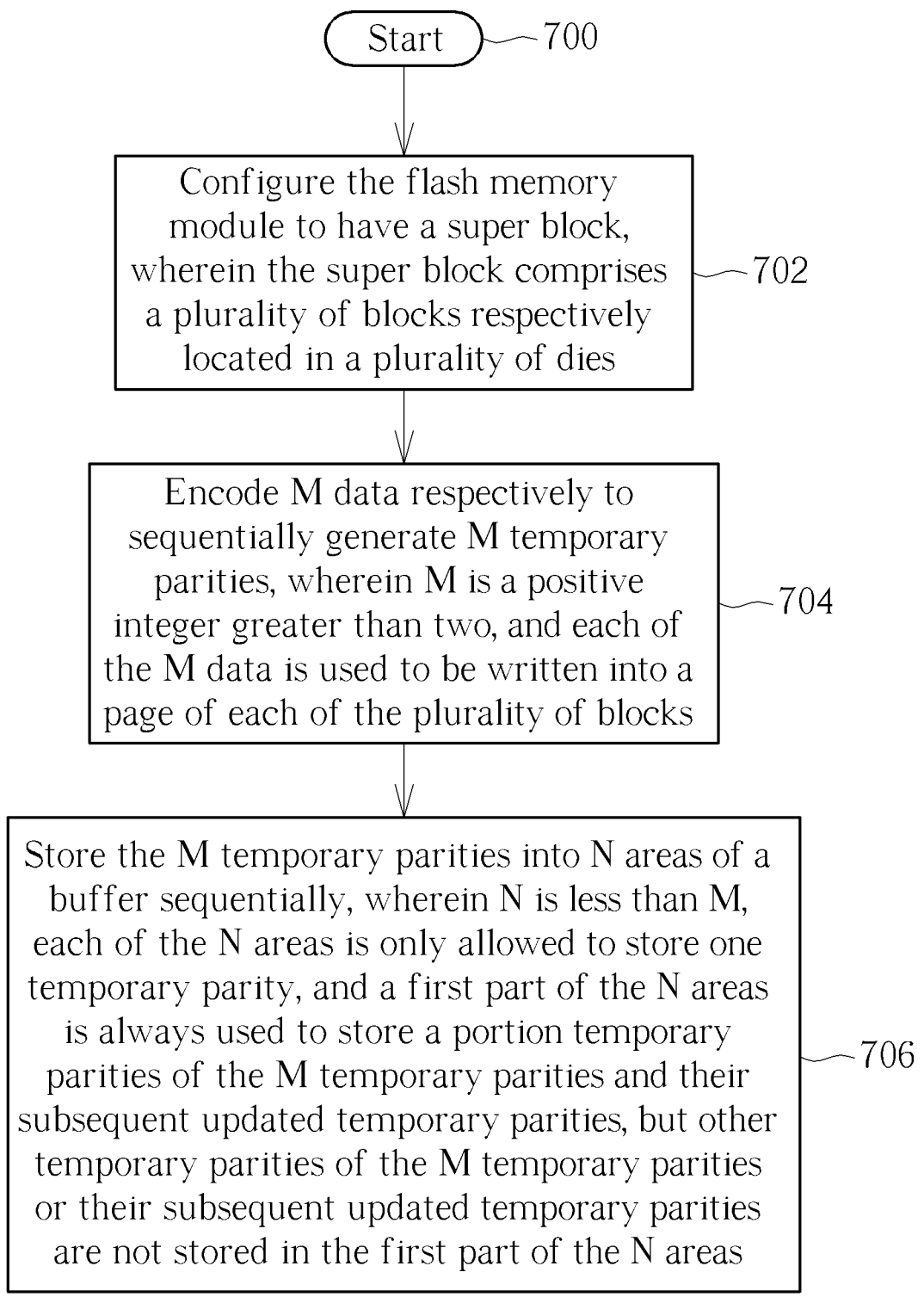
FIG. 7 is a flowchart of a method for accessing a flash memory module according to one embodiment of the present invention.

FIG. 7 is a flowchart of a method for accessing the flash memory module 120 according to one embodiment of the present invention. Referring to the above embodiments together, the flow is described as follows.

Step 700: the flow starts.

Step 702: configure the flash memory module to have a super block, wherein the super block comprises a plurality of blocks respectively located in a plurality of dies.

Step 704: encode M data respectively to sequentially generate M temporary parities, wherein M is a positive integer greater than two, and each of the M data is used to be written into a page of each of the plurality of blocks.

Step 706: store the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, but other temporary parities of the M temporary parities or their subsequent updated temporary parities are not stored in the first part of the N areas.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory module, wherein the flash memory module comprises a plurality of dies, each die comprises a plurality of blocks, each block comprises a plurality of pages, and the method comprises the steps of:
   configuring the flash memory module to have a super block, wherein the super block comprises a plurality of blocks respectively located in the plurality of dies;
   encoding M data respectively to sequentially generate M temporary parities, wherein M is a positive integer greater than two, and each of the M data is used to be written into a page of each of the plurality of blocks;
   storing the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, and a number of the first part of the N areas is equal to a number of the portion temporary parities of the M temporary parities; and other temporary parities of the M temporary parities and their subsequent updated temporary parities are not stored in the first part of the N areas, the other temporary parities of the M temporary parities are sequentially stored in a second part of the N areas, and a number of the other temporary parities of the M temporary parities is greater than a number of second part of the N areas; and
   generating M parities according to the M temporary parities, respectively, and writing the M parities into the super block.

2. The method of claim 1, wherein (N−1) areas in the N areas are always used to store the portion temporary parities in the M temporary parities and the subsequent updated temporary parities.

3. The method of claim 1, further comprising:
   for any one of the M temporary parities:
      before generating the temporary parity, if the buffer does not have a previous temporary parity for encoding to generate the updated temporary parity, moving the other temporary parities stored in the second part of the N areas of the buffer to a memory, and moving the previous temporary parity from the memory to the second part of the N areas of the buffer, for encoding to generate the temporary parity.

4. The method of claim 3, wherein the second part of the N areas is a specific area of the buffer.

5. The method of claim 4, wherein the step of before generating the temporary parity, if the buffer does not have the previous temporary parity for encoding to generate the updated temporary parity, moving the second part of the N areas of the buffer to a memory, and moving the previous temporary parity from the memory to the second part of the N areas of the buffer, for encoding to generate the temporary parity comprises:
   if the buffer does not have the previous temporary parity for encoding to generate the temporary parity, searching from a first area of the buffer to determine one area whose data is not used for encoding at this moment as a specific area; and
   moving the other temporary parity stored in the specific area of the buffer to the memory, and moving the previous temporary parity from the memory to the specific area of the buffer, for encoding to generate the temporary parity.

6. A flash memory controller, wherein the flash memory controller is used to access a flash memory module, the flash memory module comprises a plurality of dies, each die comprises a plurality of blocks, each block comprises a plurality of pages, and the flash memory controller comprises:
   a read-only memory, configured to store a program code;
   a microprocessor, configured to execute the program code to control access of the flash memory module;
   an encoder; and
   a buffer;
   wherein the microprocessor configures the flash memory module to have a super block, wherein the super block comprises a plurality of blocks respectively located in the plurality of dies; the encoder encodes M data respectively to sequentially generate M temporary parities, wherein M is a positive integer greater than two, and each of the M data is used to be written into a page of each of the plurality of blocks; the encoder stores the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, and a number of the first part of the N areas is equal to a number of the portion temporary parities of the M temporary parities; and other temporary parities of the M temporary parities and their subsequent updated temporary parities are not stored in the first part of the N areas, the other temporary parities of the M temporary parities are sequentially stored in a second part of the N areas, and a number of the other temporary parities of the M temporary parities is greater than a number of second part of the N areas; and the encoder generates M parities according to the M temporary parities, respectively, and writing the M parities into the super block.

7. The flash memory controller of claim 6, wherein (N−1) areas in the N areas are always used to store the portion temporary parities in the M temporary parities and the subsequent updated temporary parities.

8. The flash memory controller of claim 6, wherein for any one of the M temporary parities: before generating the temporary parity, if the buffer does not have a previous temporary parity for encoding to generate the updated temporary parity, the microprocessor moves the other temporary parities stored in second part of the N areas of the buffer to a memory, and moves the previous temporary parity from the memory to the second part of the N areas of the buffer, for encoding to generate the temporary parity.

9. The flash memory controller of claim 8, wherein the second part of the N areas is a specific area of the buffer.

10. The flash memory controller of claim 9, wherein if the buffer does not have the previous temporary parity for encoding to generate the temporary parity, the microprocessor searches from a first area of the buffer to determine one area whose data is not used for encoding at this moment as a specific area; and the microprocessor moves the other temporary parity stored in the specific area of the buffer to the memory, and moves the previous temporary parity from the memory to the specific area of the buffer, for encoding to generate the temporary parity.

11. A memory device, comprising:
a flash memory module comprising a plurality of dies, wherein each die comprises a plurality of blocks, and each block comprises a plurality of pages;
a flash memory controller, configured to access the flash memory module;
wherein the flash memory controller is configured to perform the steps of:
configuring the flash memory module to have a super block, wherein the super block comprises a plurality of blocks respectively located in the plurality of dies;
encoding M data respectively to sequentially generate M temporary parities, wherein M is a positive integer greater than two, and each of the M data is used to be written into a page of each of the plurality of blocks;
storing the M temporary parities into N areas of a buffer sequentially, wherein N is less than M, each of the N areas is only allowed to store one temporary parity, and a first part of the N areas is always used to store a portion temporary parities of the M temporary parities and their subsequent updated temporary parities, and a number of the first part of the N areas is equal to a number of the portion temporary parities of the M temporary parities; and other temporary parities of the M temporary parities and their subsequent updated temporary parities are not stored in the first part of the N areas, the other temporary parities of the M temporary parities are sequentially stored in a second part of the N areas, and a number of the other temporary parities of the M temporary parities is greater than a number of second part of the N areas; and
generating M parities according to the M temporary parities, respectively, and writing the M parities into the super block.

12. The memory device of claim 11, wherein (N−1) areas in the N areas are always used to store the portion temporary parities in the M temporary parities and the subsequent updated temporary parities.

13. The memory device of claim 11, wherein the flash memory controller is further configured to perform the steps of:
for any one of the M temporary parities:
before generating the temporary parity, if the buffer does not have a previous temporary parity for encoding to generate the updated temporary parity, moving the other temporary parities stored in second part of the N areas of the buffer to a memory, and moving the previous temporary parity from the memory to the second part of the N areas of the buffer, for encoding to generate the temporary parity.

14. The memory device of claim 13, wherein the second part of the N areas is a specific area of the buffer.

15. The memory device of claim 14, wherein the step of before generating the temporary parity, if the buffer does not have the previous temporary parity for encoding to generate the updated temporary parity, moving the second part of the N areas of the buffer to a memory, and moving the previous temporary parity from the memory to the second part of the N areas of the buffer, for encoding to generate the temporary parity comprises:
if the buffer does not have the previous temporary parity for encoding to generate the temporary parity, searching from a first area of the buffer to determine one area whose data is not used for encoding at this moment as a specific area; and
moving the other temporary parity stored in the specific area of the buffer to the memory, and moving the previous temporary parity from the memory to the specific area of the buffer, for encoding to generate the temporary parity.

\* \* \* \* \*